United States Patent [19]

Malzahn

[11] 3,852,491
[45] Dec. 3, 1974

[54] HIGH PROTEIN READY-TO-EAT BREAKFAST CEREAL

[75] Inventor: Wayne Robert Malzahn, Ballwin, Mo.

[73] Assignee: Ralston Purina Company, St. Louis, Mo.

[22] Filed: Mar. 22, 1972

[21] Appl. No.: 237,166

[52] U.S. Cl.................................. 426/346, 426/141
[51] Int. Cl............................ A23l 1/18, A23l 1/10
[58] Field of Search ............... 99/14, 17, 83, 81, 82; 426/346, 364

[56] References Cited
UNITED STATES PATENTS

| | | | |
|---|---|---|---|
| 3,185,574 | 5/1965 | Gabby et al. | 99/83 X |
| 3,637,400 | 1/1972 | Mullen et al. | 99/83 |
| 3,664,848 | 5/1972 | Bedenk et al. | 99/83 |
| 3,687,686 | 8/1972 | Bedenk | 99/83 |
| 3,687,687 | 8/1972 | Liepa | 99/83 |
| 3,689,279 | 9/1972 | Bedenk | 99/83 |
| 3,708,308 | 1/1973 | Bedenk et al. | 99/81 |

*Primary Examiner*—James R. Hoffman
*Attorney, Agent, or Firm*—Veo Peoples, Jr.; Virgil B. Hill

[57] ABSTRACT

A puffed ready-to-eat breakfast cereal containing to about 60 percent protein is made by blending a bland edible protein material and a farinaceous material, adding moisture to a level of 17 to 30 percent, kneading the mixture and extruding it at pressures greater than about 1,000 p.s.i.g. at a temperature greater than the boiling point of water.

3 Claims, No Drawings

HIGH PROTEIN READY-TO-EAT BREAKFAST CEREAL

The product of this invention relates to a protein fortified, ready-to-eat breakfast cereal. Protein is an essential component of human growth. Unfortunately, meat, the most palatable and nutritious protein, is relatively expensive. There have been several attempts made in the past to utilize various non-meat protein sources to provide adequate protein for purposes of nutrition. Unfortunately many of the high quality non-meat protein sources are of minimal palatability. For this reason these proteins have been combined with other foods. For example, several attempts have been made to produce a "so called" protein fortified breakfast cereal. This type of breakfast cereal, usually, has protein from a vegetable derived product such as soy or other oil seeds or has milk derived protein such as casein or refined whey fractions. So far, attempts to produce fortified, ready-to-eat breakfast cereals have centered around making of flakes having protein coated on the surface. One of the problems with this approach is that the proteins are characterized by somewhat objectionable flavors and by concentrating the protein on the outside of the ready-to-eat breakfast cereal the flavor intensity of the protein is also increased. Another problem associated with coating the cereal flakes with a supplemental protein source is the change in rehydration characteristics. These rehydration characteristics are vastly altered when protein is added to the surface at a level of say 20 percent. Because of this, the amount of protein which can be added to a flake-type breakfast cereal is severely limited. For example, the highest level of protein addition to ready-to-eat breakfast cereal flakes applicant is aware of is in U.S. Pat. No. 3,450,540 where there is a disclosure that one part protein can be added to two parts of cereal with this protein being adhered to the outside of the flake. However, the preferred maximum when soy (one of the preferred protein sources) is used, is only half of the above level.

Cooking, shaping and puffing by means of extrusion are well known in the ready-to-eat breakfast cereal art. It is also known that a product with a proteinaceous matrix having a texture similar to meat upon rehydration can be made in an extruder with as little as about 35 percent protein (See U.S. Pat. No. 3,496,858 issued to Jenkins).

It is known that low levels of protein can be incorporated in a puffed farinaceous matrix (See U.S. Pat. No. 3,447,929 issued to Hale). It has, also, been conventional wisdom that protein (with the possible exception of high grade elastic wheat gluten) at substantial levels, e.g., above about 15 percent will interfere with the formation of a puffed farinaceous matrix during extrusion, and may, as levels approach 35 percent begin to form a proteinaceous fiber-like mass. The difference between a farinaceous matrix and the fiber-like proteinaceous mass will be discussed below. Previous attempts to produce a puffed farinaceous product have produced discontinuity of flow of extrudate and/or an amorphous substantially unpuffed mass at the extruder exit.

It has now been found that by extruding at high pressures within a controlled temperature range at moderate moisture levels, a puffed ready-to-eat product having the texture, appearance and hydration characteristics of conventional puffed breakfast cereals can be produced with protein levels up to 60 percent by ingredient weight.

There are a variety of factors which influence the degree of puffing. The most important of these factors are the amount of moisture in the dough, the presence and type of non-farinaceous additives, temperature and pressure. For purposes of this invention, a puffed ready-to-eat breakfast cereal is defined as an expanded product with a bulk density of 0.046 g/cc to 0.135 g/cc having a farinaceous matrix and a cellular structure which will rapidly lose its structure when compared to a product having a proteinaceous fiber-like component, upon subjection to agitation in boiling water.

For the production of the product of this invention moisture added to form the dough immediately prior to its entrance into the extruder is in the range of about 10 to 30 percent by weight of the ingredients. (The ingredients themselves will generally, contain from 8 to 10 percent by weight of moisture, therefore, the total moisture is somewhat higher than the figures represented by adding moisture.)

Pressure needed to produce the product of this invention is at least about 1,000 p.s.i.g. at protein levels of 35 – 40 percent. Surprisingly, it seems that lower pressures can be used for the higher protein levels within the range of the product of this invention. Maximum pressures used are dependent mostly on the capabilities of the extruder although pressures up to 3,000 – 5,000 p.s.i.g. are adequate for purposes of this invention and are easily obtainable on common food extruders. It is, of course, possible to use higher pressures but it is easier to control other variables to reach the desired end product.

Maximum temperature need be only slightly above that of boiling water. It has been found that a product temperature greater than 230°F is sufficient to produce a puffed product within the definition given above when protein is added at a level of 55 percent ingredient weight at a pressure of 1,500 p.s.i.g.

Maximum temperature is generally determined by that which will decompose or biologically inhibit the ingredients; as discussed in greater detail below. However, when the higher protein levels within the scope of this invention are used, maximum values are established by another criterion. For example, at protein levels of 55 percent the formation of a fiber-like protein structure becomes apparent where product temperature measured in the exit orifice exceeds 315°F with an added moisture level of about 30 percent at a pressure of 1,500 p.s.i.g.

In another instance with the same protein level, lower moisture, i.e., 17 percent by weight and 2,200 p.s.i.g. dough temperature greater than about 345°F were needed to induce formation of a proteinaceous fiber. In both cases other extrusion conditions were identical.

While temperatures greater than boiling are required and temperatures much greater than 350°F will cause some damage to the product, other maximum and minimum conditions are not so easily established. In general, formation of fiber-like proteinaceous strands is dependent on the severity of the extrusion. As either temperature, pressure screw pitch or screw rpm increases the possibility of fiber-like formations also increases. Also, the lower the moisture level the more likely the extrudate is to form fibers. Therefore, for purposes of this invention the lowest temperature and pressure to produce expansion should be used at the higher protein levels within the ranges described above.

The product of this invention may be varied depending upon its ultimate use. If a ready-to-eat breakfast cereal made up completely of the product of this invention is eaten at a normal serving rate, i.e., 1 oz. and the product contain 60 percent protein, there is sufficient protein to satisfy the minimum daily adult requirement for one day. Another variant within the ambit of the teaching of this invention, is the making of a sweetened ready-to-eat breakfast cereal. With a sweetened coating, typically about 30 percent by weight of the cereal product, a protein fortified cereal is produced which contains 20 percent by weight protein and a 1 oz. serving of the pre-sweetened ready-to-eat breakfast cereal will provide one-third and one-fourth of the minimum daily requirement of protein for children between the ages of 6 and 11. Note that the above figures are calculated without the addition of milk, therefore, the ready-to-eat breakfast cereal may be eaten as a snack. These requirements are still satisfied.

The farinaceous source material for the product of this invention may be virtually any grain with the following caveat, farinaceous source materials, which are difficulty gelatinizable are not preferred, because they have a tendency to scorch. An example of such a non-preferred grain is unmodified corn starch. Some modified corn starches will, of course, be suitable because some of the treatments involved aid in the ease of gelatinization. Certainly, pre-gelatinized corn starch as a farinaceous source material will provide no problem. A further caveat is that for reasons of nutrition it is preferred that there is a minimum amount of reducing sugar present in the farinaceous material. The reducing sugars react with certain amino acids which are present in proteinaceous materials and which are necessary for nutrition, particularly lysine. This reaction is known as the Maillard or protein browning reaction and inhibits the biological activity of the amino acids.

The choice of protein will depend primarily on economics. Although soy and other oil seed proteins are generally somewhat more objectionable from a flavor standpoint; the process of this invention tends to minimize the objectionable flavors and sweetened cereals especially exhibit almost no discernible "beany" taste.

Whey as a protein source, is reasonable economically, but, has problems which are related to the Maillard reaction described above. Whey protein is very seldom available in pure form and carries substantial amounts of lactose, a fairly strong reducing sugar as it is sold commercially. This, of course, limits the practicality of the use of whey as the sole protein source. However, as a matter of economics, whey may be added in conjunction with the vegetable derived proteins or possibly in conjunction with casein. For purposes of nutrition, various amino acids may be added at some stage in the process to more perfectly balance the amino acid content in the particular proteinaceous material chosen. For example, most vegetable protein is deficient in lysine, however, soy protein has ample lysine but is deficient in another amino acid, methionine. For proper nutrition therefore, supplementation with the proper amino acids is desirable.

Examples of the product of this invention follow. These examples are designed to illustrate the wide variety of the processing conditions useful to produce the product of this invention, as well as, the interrelationship between these conditions. In all examples the proteinaceous source and the farinaceous material were mixed together in a dry state, although containing their natural moisture. The moisture in the ingredients of the dry blend is between about 8 and 10 percent. This dry blending was then followed mixing with water. The moistened mixture was then extruded through a 6 zone extruder containing a constant pitch screw having a variable root diameter with a length to diameter ratio of 24 to 1 through a circular extruder orifice with a diameter of 0.172 in. The rpm on the auger screw was maintained between 90 and 120 to help maintain a continuous extrudate flow in all Examples. It should be noted that not all examples have product temperatures. Where the product temperatures are given they were measured as the product exited through the extruder orifice. It has been found that temperatures in the sixth or outermost zone are 5° to 15°F higher than the product temperature measured at the extruder orifice as the temperature increased from 250°F to 300°F. In the temperature range from 300° to 350°F in the sixth zone the product exit temperature is 15° to 40°F lower than the temperature in the sixth zone. The extruder, at the time of some of the runs of some of the experiments, did not contain the means for temperature measurement at the orifice but subsequent runs have confirmed this temperature correlation.

EXAMPLE 1

The following formulation was prepared as described above:

| INGREDIENT | PERCENTAGE |
| --- | --- |
| Soy Isolate (Spray dried) | 55 |
| Wheat Starch | 33 |
| Oat Flour | 10.5 |
| Salt | 1.5 |

This formulation produced a calculated protein level of 55 percent. The extrusion took place with the maximum pressure being maintained between 1,000 and 1,500 p.s.i.g. The temperature in the highest temperature zone, i.e., zone 6 in this example was 355°F. The dough temperature measured at the exit port was increased until a temperature of 315°F was obtained. As the temperature reached this level the dough started to change character and when the dough temperature was raised above 315°F, the dough exhibited the formation of the fiber-like proteinaceous strands mentioned above. The extrusion run was continued and the dough temperature consistently lowered until at 225°F, the product produced at the exit port of the extruder was devoid of cellular structuring and could no longer be considered expanded. Temperature at zone 6, at the time the dough temperature was measured at 225°F was 230°F. The level of added moisture in this example was 29.85 percent. The structure on the product made between 225°F and 315°F which was cereal-like in appearance, puffed and frangible was similar to other extruded cereal products with the degree of the expansion increasing with increasing temperature.

EXAMPLE 2

Moisture is a known lubricant and puffing aid for farinaceous systems, therefore, a decrease in moisture, everything being equal should narrow the temperature range in which the product of this invention can be produced. In this example, however, the maximum pressure applied was increased to a level of 2,200 p.s.i.g. The moisture level in this example was 17 percent as added moisture. The ingredients were the same as in the above example. It was found that when the dough temperature greater than 345°F production of protein fiber-like masses described in the above example commenced. The increase in maximum extrusion pressure therefore, more than counteracted the decrease in moisture as far as establishing the breadth of the operating temperature range. When this product was placed in water and the water brought to a boil the product structure started to disintegrate.

EXAMPLE 3

The same ingredients used in Examples 1 and 2 were used in example 3. However, the percentages were changed to yield a product having 42 percent by ingredient weight calculated protein. The percentages of ingredients are expressed below:

| INGREDIENT | PERCENTAGE |
|---|---|
| Soy Protein Isolate (spray dried) | 35 |
| Wheat starch | 13 |
| Oat Flour | 50.5 |
| Salt | 1.5 |

The product in this example extruded at a maximum pressure of 1,200 p.s.i.g. with same equipment as in the proceeding example. It was found, surprisingly, that the temperature of 250°F was needed to produce the minimum amount of puffing within the definition of a ready-to-eat puffed breakfast cereal indicated in the disclosure above. While generally it had been accepted in the art, that protein was a puff inhibitor for farinaceous extrusion, this example shows that, quite the contrary, protein may actually serve as a puff enhancer.

This product sample was sugar coated with a coating comprised of 54.5 percent white sugar, 6 percent brown sugar, 1.5 percent salt, 8 percent corn syrup, 12 percent coconut oils and 18 percent water to produce a 40 percent weight coating (dry). The product was dried to remove coating by water and a sweetened breakfast cereal with no discernible "beany" flavor was produced having a protein content of 20 percent.

EXAMPLE 4

This example illustrates the minimum amount of water which may be added to produce the product of this invention. The formula for this example is as follows:

| INGREDIENT | PERCENTAGE |
|---|---|
| Soy Protein Isolate | 49.97 |
| Wheat Starch | 29.98 |
| Oat Flour | 18.49 |
| Salt | 1.50 |
| Na Ascorbate | .02 |
| Color | .03 |

Extrusion was conducted with a maximum extruder pressure of between 2,000 and 2,200 p.s.i.g. maintained throughout the extruder run. Maximum temperature obtained was in the last zone and was 310°F (producing a product temperature equivalent to approximately 290°F to 295°F). As in all the other examples the heat take up throughout the 6 zones was gradual ranging from room temperature in this case to the maximum in the sixth zone. Moisture was added at a level of 10.47 percent. The resultant product when collected from the extruder orifice and dried had a small cellular structure which had a bulk density of 0.051 g/cc to 0.057 g/cc. Although, this product, evidences less expansion than the products in the other examples it was still definitely puffed and within the range of the product of our invention from the standpoint of bulk density.

As is amply illustrated by the above examples that the product of this invention can be derived by a variety of formulations and operating conditions. The examples merely serve to illustrate some of the possible combinations useful at arriving at the end product and should not be considered limiting of definitive of the ambit of this invention.

Having completely and fully disclosed the product of the invention, I hereby claim:

1. A process for the production of a puffed protein fortified cereal product having a bulk density of between 0.046 g/cc and 0.135 g/cc with a protein content of between about 35 to 60 percent wherein the fortifying protein is uniformly dispersed within the puffed structure of the cereal product thereby improving palatability and rehydration characteristics of the cereal product without a deleterious effect on puffing of the product comprising: forming a dough by the addition of moisture to a mixture of ingredients comprising soy protein isolate and farinaceous ingredients, the amount of added moisture being from about 17 percent to about 30 percent by weight based on the weight of the mixture of ingredients, the amount of soy protein isolate being from about 35 percent to about 60 percent by weight based on the weight of the mixture of ingredients, and the amount of farinaceous ingredients being the substantial remainder of the mixture of ingredients; and extruding the dough at a temperature of between about 225 and 345°F. at a pressure of between 1,000 and 2,200 p.s.i.g. to form a puffed, protein fortified cereal product.

2. A process as set forth in claim 1 wherein the moisture is added at about 17 percent by weight and the dough is extruded at a temperature of between about 225° and 315° F. and at a pressure of between about 1,000 and 1,500 p.s.i.g.

3. A process as set forth in claim 1 wherein the moisture is added at about 30 percent by weight and the dough is extruded at a pressure of between about 2,000 and 2,200 p.s.i.g.

* * * * *